United States Patent [19]

Sugawara

[11] Patent Number: 5,518,308
[45] Date of Patent: May 21, 1996

[54] METHOD OF CONTROLLING ANTI-SKID BRAKE SYSTEM HAVING ONE MODULATOR AND TWO WHEEL SPEED SENSORS FOR EACH AXLE

[75] Inventor: Ryuta Sugawara, Higashimatsuyama, Japan

[73] Assignee: Jidosha Kiki Co., Ltd., Tokyo, Japan

[21] Appl. No.: 359,824

[22] Filed: Dec. 20, 1994

[30] Foreign Application Priority Data

Jan. 27, 1994 [JP] Japan .................. 6-007938

[51] Int. Cl.$^6$ .................................................. B60T 8/32
[52] U.S. Cl. .................. 303/169; 188/181 C; 303/127; 303/123; 303/170; 303/149
[58] Field of Search ................. 303/118.1, 149, 303/127, 123, 158, 170, 121, 7, 169, 159, 173, 157, 159; 188/181 A, 181 C, 181 R, 157

[56] References Cited

U.S. PATENT DOCUMENTS

| | | | |
|---|---|---|---|
| 3,620,577 | 11/1971 | Neisch et al. | 303/118.1 |
| 3,740,105 | 6/1973 | Holmes | 303/118.1 |
| 3,743,362 | 7/1973 | Neisch | 303/118.1 |
| 3,794,389 | 2/1974 | Davis et al. | 303/170 |
| 4,260,199 | 4/1981 | Reinecke | 303/127 |
| 4,784,444 | 11/1988 | McCann et al. | 303/127 |
| 4,844,555 | 7/1989 | Maehara . | |
| 5,185,702 | 2/1993 | Okubo | 303/170 |

*Primary Examiner*—Douglas C. Butler
*Attorney, Agent, or Firm*—Kanesaka & Takeuchi

[57] ABSTRACT

In a method of controlling an anti-skid brake system for a vehicle having one modulator and two wheel speed sensors for each axle, when the vehicle brakes during running, for example, on a split road where surface friction coefficients on the right and left surfaces of the road are greatly different from each other or on a curved road where torque values of the right and left wheels are quite different from each other, in case that one of the right and left wheels which is lower torque is set in a pressure reducing mode while the other wheel which is higher torque of the road is in a normal service braking state, a retaining mode or a slow pressure reducing mode is selected to the braking pressure of the right and left wheels. Therefore, when the conditions of the right and left wheel are quite different from each other as mentioned above, the braking pressure is retained or is intensified slowly so as to secure its braking force and thereby shorten the braking distance of the vehicle.

4 Claims, 3 Drawing Sheets

| left wheel / right wheel | P R | R | P I | S B |
|---|---|---|---|---|
| P R | P R | P R | P R | R |
| R | P R | R | R | R |
| P I | P R | R | P I | P I |
| S B | R | R | P I | S B |

PR: pressure reducing mode
R : retaining mode
PI: pressure intensifying mode
SB: service braking state

| left wheel / right wheel | P R | R | P I | S B |
|---|---|---|---|---|
| P R | P R | P R | P R | R |
| R | P R | R | R | R |
| P I | P R | R | P I | P I |
| S B | R | R | P I | S B |

PR: pressure reducing mode
R : retaining mode
PI: pressure intensifying mode
SB: service braking state

Fig. 3

| left wheel / right wheel | P R | R | P I | S B |
|---|---|---|---|---|
| P R | P R | P R | P R | S P I |
| R | P R | R | R | R |
| P I | P R | R | P I | P I |
| S B | S P I | R | P I | S B |

PR: pressure reducing mode
R : retaining mode
PI: pressure intensifying mode
SB: service braking state
SPI: slow pressure intensifying mode Fig. 5
*Prior Art*

| left wheel / right wheel | P R | R | P I | S B |
|---|---|---|---|---|
| P R | P R | P R | P R | P R |
| R | P R | R | R | R |
| P I | P R | R | P I | P I |
| S B | P R | R | P I | S B |

PR: pressure reducing mode
R : retaining mode
PI: pressure intensifying mode
SB: service braking state

10

METHOD OF CONTROLLING ANTI-SKID BRAKE SYSTEM HAVING ONE MODULATOR AND TWO WHEEL SPEED SENSORS FOR EACH AXLE

BACKGROUND OF THE INVENTION

The present invention relates to a method of controlling an anti-skid brake system for a vehicle, for example a trailer or the like, which is equipped with one modulator and two wheel speed sensors for each axle, in which the modulator for controlling the anti-skid. brake system is common to right- and left-wheel brakes for each axle supporting right and left wheels, and the wheel speed sensors are disposed for the right and left wheels, respectively. More particularly, the present invention relates to a method of controlling an anti-skid brake system having one modulator and two wheel speed sensors for each axle in which the determination of whether the wheels are in locking tendency is performed by selecting a lower wheel speed out of the right and left wheel speeds, herein referred to as "Select Low Operation".

Recently, a brake of a trailer is also equipped with an anti-skid brake system (hereinafter sometimes referred to as ABS) which performs an anti-skid brake control to adjust braking pressure of a wheel which is in skid tendency during braking. An ABS for the trailer is shown in FIG. 4 as an example of such a conventional ABS for the trailer.

As shown in FIG. 4, the trailer 1 is equipped with right and left front wheels 4 and 3 supported rotatably to a front axle 2, right and left rear wheels 7 and 6 supported rotatably to a rear axle 5, power chambers 9, 8, 11, and 10 for actuating brakes of wheels which are disposed for the right and left front wheels 4, 3 and the right and left rear wheels 7, 6, respectively, an ABS modulator 12 connected to the power chambers 9, 8, 11, and 10 for controlling a supply of compressed air to the power chambers 9, 8, 11, and 10 and adjusting braking force during ABS operation, a service line 13 connected to a relay valve (not shown) in the ABS modulator 12 for supplying service brake signal pressure for controlling the operation of service brakes for the right and left front wheels 4, 3 and the right and left rear wheels 7, 6, an emergency line 14 connected to an emergency valve (not shown) in the ABS modulator 12 for supplying emergency brake signal pressure for controlling the operation of emergency brakes of the right and left front wheels 4, 3 and the right and left rear wheels 7, 6 when an emergency situation occurs, an air reservoir 15 for reserving the compressed air, wheel speed sensors 17 and 16 disposed for the right and left front wheels 4 and 3 respectively for detecting the wheel speed of the corresponding wheels, and an electronic control unit (hereinafter sometimes referred to as ECU) 18 for receiving each wheel speed signal from the wheel speed sensors 17 and 16 and outputting a control signal for controlling the operation of the ABS modulator 12 into the ABS modulator 12. The numerals 19 and 20 designate couplings for connecting the service line 13 and the emergency line 14 to pipelines at a tractor side not shown, respectively. The numeral 21 designates a coupling for connecting the electronic control unit ECU 18 to a electrical wiring at the tractor side.

The trailer 1 is equipped with the one ABS modulator 12 for the power chambers 9, 8 for the right and left front wheels 4, 3 supported to the front axle 2 and equipped with the two wheel speed sensor 17, 16 for the right and left front wheels 4, 3, respectively (in an example shown in FIG. 4, the ABS modulator 12 is also common to the power chambers 11, 10 for the right and left rear wheels 7, 6).

In the trailer 1 as structured mentioned above, the relay valve in the ABS modulator 12 is switched according to a service brake operational signal passing through the service line 13 from the tractor side, so that the compressed air in the air reservoir 15 is sent to each of the power chambers 9, 8, 11, and 10 so as to operate the service brakes of the right and left front wheels 4, 3 and the right and left rear wheels 7, 6. When an emergency situation occurs, such as when the tractor and the trailer are separated, the emergency valve in the ABS modulator 12 is operated according to an emergency brake operational signal passing through the emergency line 14 so as to operate the emergency brakes of the right and left front wheels 4, 3 and the right and left rear wheels 7, 6 in the stone way.

Further, as the ECU 18 determines that at least either of the right and left front wheels 4, 3 is in locking tendency by the Select Low Operation using the wheel speed signal from the wheel speed sensors 17, 16, the ECU 18 outputs an anti-skid brake control signal to the ABS modulator 12. The anti-skid brake control signal makes ABS modulator 12 to perform an anti-skid brake control for adjusting the braking pressure in the power chambers 9, 8, 11, 10, thereby controlling the braking forces of the right and left front wheels 4, 3 and the right and left rear wheels 7, 6 so as to eliminate the locking tendency.

Such a conventional trailer 1 is equipped with the one ABS modulator 12 and the two wheel speed sensors 17, 16 for the right and left wheels for each axle, the determination of whether the wheels are in locking tendency is performed by selecting the lower wheel speed out of the right and left wheel speeds, that is by the Select Low Operation, thereby performing the anti-skid brake control equally to the right and left wheels. The ABS operation by the Select Low Operation is performed, for example, in accordance with an ABS map shown in FIG. 5. That is, each wheel speed of the right and left wheels is compared with a vehicle speed to judge whether each of the right and left wheels is in a pressure reducing mode, a retaining mode, or a pressure intensifying mode, respectively. As a result of this, when at least either of the right and left wheels is in the pressure reducing mode, the ABS for both right and left wheels sets up the pressure reducing mode even when the other wheel is in any mode. Further when at least either of the right and left wheels is in the retaining mode, the ABS for both right and left wheels sets up the retaining mode even when the other wheel is in any mode but the pressure reducing mode. Furthermore, when at least either of the right and left wheels is in the pressure intensifying mode and the other wheel is in the pressure intensifying mode or a service braking state, the ABS for both right and left wheels is set to the pressure intensifying mode.

Therefore, when the vehicle runs, for example, on a split road where surface friction coefficients (hereinafter sometime referred to as "μ" simply) on the right and left surfaces of the road are greatly different from each other, the wheel on the lower μ surface of the road tends to lock. Therefore, the brakes of the right and left wheels are introduced into the pressure reducing mode for the ABS when the ABS determines the locking tendency of the wheel on the lower μ surface and the wheel on the lower μ surface is in the pressure reducing mode. Thereby, even when the other wheel on the higher μ surface is not in locking tendency, the braking pressure of the other wheel on the higher μ surface is also reduced so that the whole braking force of the trailer I becomes insufficient, thereby extending the braking distance of the vehicle.

Furthermore, in the conventional trailer 1, such a problem occurs also when torque values of the right and left wheels are quite different from each other, such as during braking when the trailer 1 turns.

SUMMARY OF THE INVENTION

It is an object of the present invention to provide a method of controlling an anti-skid brake system having one modulator and two wheel speed sensors for each axle which permits a vehicle to stop in a minimum possible braking distance when the vehicle, which is equipped with one ABS modulator common to right and left wheels and with two wheel speed sensors for both wheels respectively for each axle, runs on a split road or turns and an anti-skid brake control by the Select Low Operation is performed.

For accomplishing the above mentioned object, the present invention provides a method of controlling an anti-skid brake system of a vehicle equipped with one ABS modulator common to both brakes of right and left wheels and with two wheel speed sensors disposed for the right and left wheels respectively for each axle, in which, during braking, an anti-skid brake control is performed equally to right and left wheels by Select Low Operation, that is by detecting each wheel speed of the right and left wheels, judging each locking tendency of the right and left wheels by a predetermined method using the wheel speeds detected above, and determining whether the right and left wheels are in locking tendency based on a low wheel speed selected out of right and left wheel speeds; wherein when one of the right and left wheels is in a pressure reducing mode for the anti-skid brake control and the other wheel is in a service braking mode, a retaining mode or a slow pressure intensifying mode for the anti-skid brake control is set to the right and left wheels by the ABS modulator.

In the present invention structured above, as the vehicle, which is equipped with one ABS modulator common to both brakes of right and left wheels and with two wheel speed sensors disposed for the right and left wheels respectively, is braked during running on a split road or turning, each locking tendency of the right and left wheels is judged based on each wheel speed detected for the right and left wheels respectively. If a result of judging the locking tendency of the lower wheel speed is that the wheel is in locking tendency, the anti-skid brake control is performed equally to the right and left wheels according to the determination. In this case, when one of the right and left wheels is set in the pressure reducing mode and the other wheel is in the service braking mode, a retaining mode or a slow pressure intensifying mode is selected for the braking pressure for the right and left wheels.

Therefore, the braking pressure can be provided at a contented value even when one of the right and left wheels is in the pressure reducing mode and the other wheel is in the service braking mode, thereby shortening the braking distance. Especially when the slow pressure intensifying mode is selected, the braking pressure is intensified slowly even if the braking pressure is at a low pressure. Therefore, the braking pressure can be provided at a great value so as to further shorten the braking distance as compared to a case of retaining the braking pressure, such as selecting the retaining mode.

Still other objects and advantages of the present invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is a diagram showing another ABS map used in another embodiment of the present invention;

FIG. 5 is a diagram showing an ABS map used in a conventional method of controlling the anti-skid brake system of a vehicle which is equipped with one modulator and two wheel speed sensors for each axle.

DESCRIPTION OF THE PREFERRED EMBODIMENTS

Hereinafter, embodiments of the present invention will now be described referring to attached drawings.

Figures 1, 2:
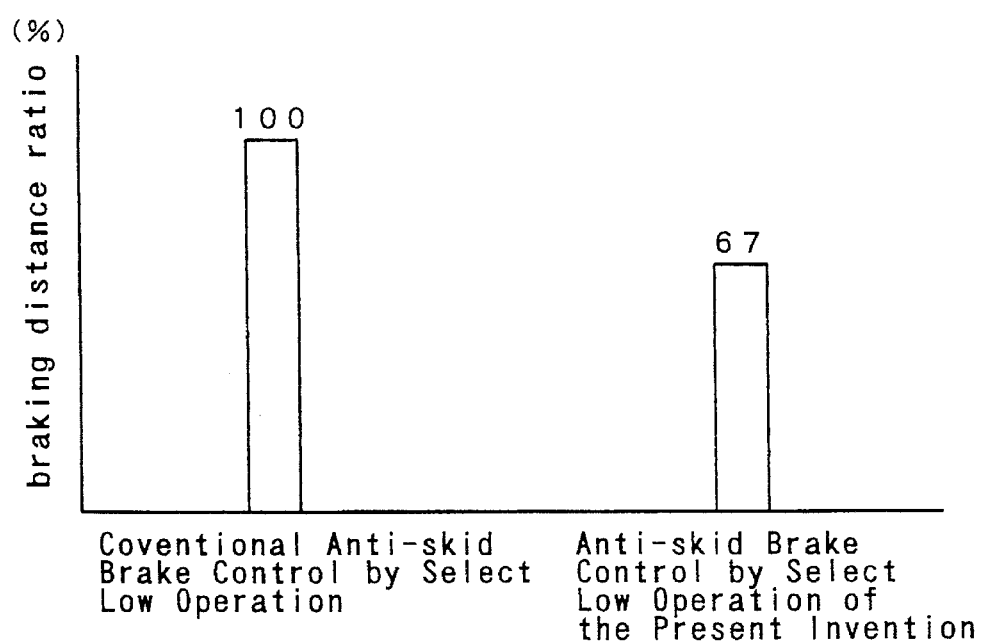
FIG. 1 is a diagram showing an ABS map used in one embodiment of a method of controlling an anti-skid brake system having one modulator and two wheel speed sensors for each axle according to the present invention.
FIG. 2 is a diagram showing a result of testing in accordance with the ABS map shown in FIG. 1.
Figure 4:
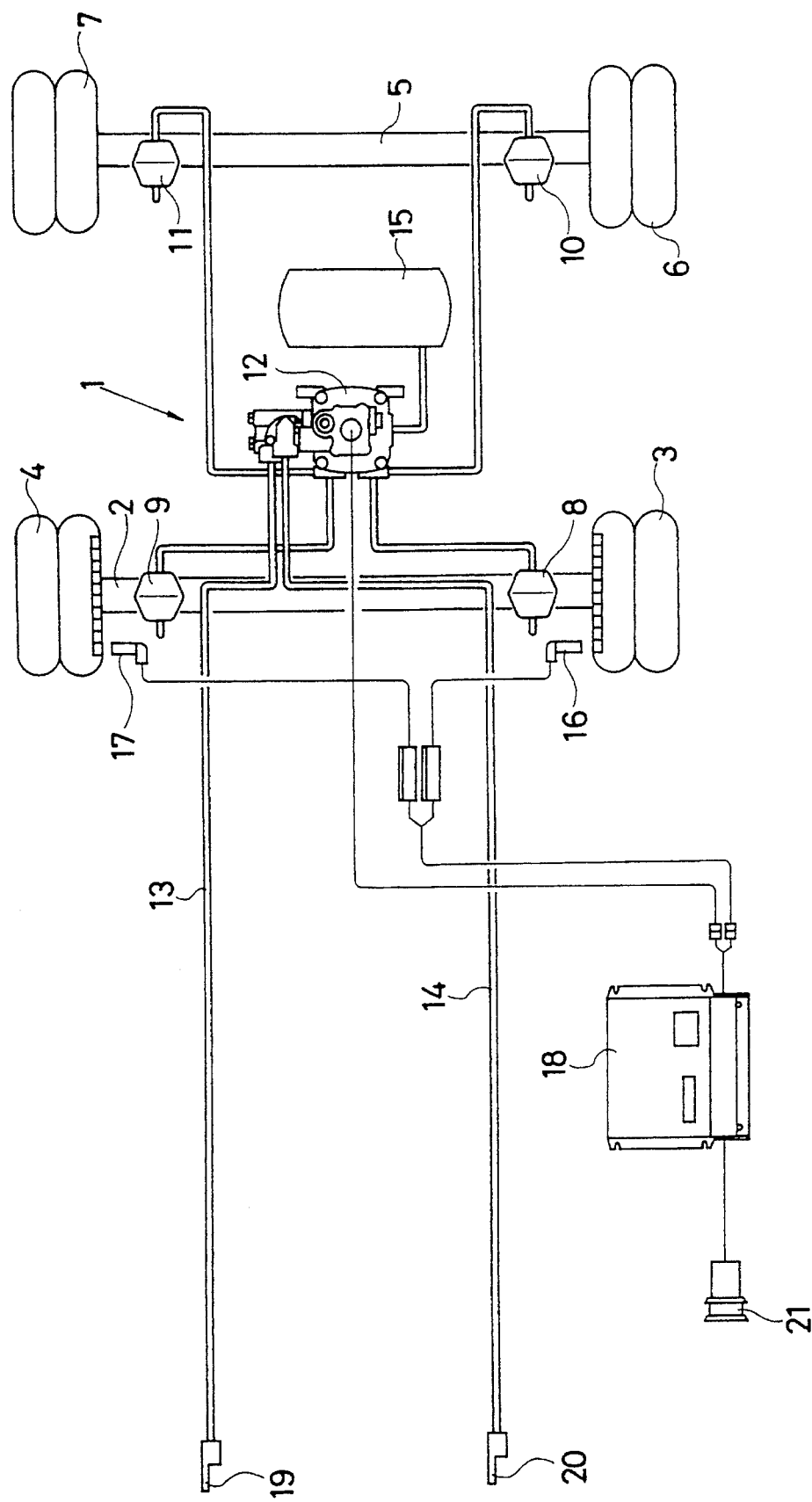
FIG. 4 is a view showing a conventional anti-skid brake system mounted in a trailer.

Compared to the conventional ABS map by the Select Low Operation mentioned above, in accordance with an ABS map of the present invention, when one of right and left wheels is in a pressure reducing mode for the ABS and the other wheel is in a service braking mode, the both right and left wheels are set to a retaining mode of the ABS as shown in FIG. 1. As apparent from FIG. 1, in this embodiment, the ABS map is same as the ABS map shown in FIG. 5 except the case mentioned above.

According to this embodiment as structured above, when the vehicle brakes during running on a split road where $\mu$ values on the right and left surfaces of the road are quite different from each other, each wheel speed of the right and left wheels is compared to the vehicle speed separately to judge whether each of the right and left wheels is in a pressure reducing mode, a retaining mode, or a pressure intensifying mode. As a result of this, when the wheel on the lower $\mu$ surface of the road is in locking tendency so as to select the pressure reducing mode while the wheel on the higher $\mu$ surface of the road is not in locking tendency and is in a normal service braking mode, the braking pressure for the right and left wheels are selected to be in the retaining mode in accordance with the ABS map shown in FIG. 1. When the right and left wheels are in such states, the braking pressure is retained as it is, thereby shortening the braking distance without reducing the braking pressure of the right and left wheels as the conventional method.

As a result of actual testing with the ABS map shown in FIG. 1, the result is obtained as shown in FIG. 2. The split road used in this testing has a lower $\mu$ surface of which $\mu$ is approximately 0.1 and a higher $\mu$ surface of which $\mu$ is approximately 0.7. As apparent from FIG. 2, if the braking distance in case of using the ABS map shown in FIG. 5 is 100%, the braking distance in case of using the ABS map shown in FIG. 1 is 67%. That is, the result is that the braking distance can be shortened by its one third.

Though when the wheel on the lower $\mu$ surface of the road is selected to the pressure reducing mode while the wheel on the higher $\mu$ surface of the road is in the service braking mode, the retaining mode is selected to the braking pressure for the right and left wheels in the above described embodiment, a slow pressure intensifying mode may be selected to the braking pressure for the right and left wheels as shown in FIG. 3. The slow pressure intensifying mode is performed by repeating combinations of a short period of pressure intensifying and retaining. By selecting the slow pressure intensifying mode as mentioned above, the braking pressure is intensified slowly even in a case in which the wheel on the lower μ surface is in the pressure reducing mode and the wheel on the higher μ surface is in the service braking mode when the braking pressure is low, thereby providing a greater braking force and thus shortening the braking distance as compared to the case of retaining the braking pressure, such as selecting the retaining mode.

Though the trailer having two axles is employed as the vehicle equipped with one modulator and two wheel sensors for each axle of the present invention in the above described embodiment, it is not confined to such a vehicle and the present invention can be applied to any vehicle having at least one axle equipped with one ABS modulator common to both brakes of right and left wheels and with two wheel speed sensors disposed for the right and left wheels, respectively, regardless of how many axles the vehicle has. The axle of the present invention may be an axle extending between the right wheel and the left wheel as described in the embodiment, or may be separated into two right and left axles which are disposed along the same axis.

As apparent from the above description, in the method of controlling the anti-skid brake system of the vehicle equipped with one modulator and two wheel speed sensors for each axle according to the present invention, the braking pressure can be provided at a contented value by selecting the retaining mode or the slow pressure intensifying mode to the braking pressure for the right and left. wheels when the vehicle, which is equipped with one ABS modulator common to the right and left wheels and with the two wheel speed sensors for both wheels respectively for each axle, runs on the split road or turns and an anti-skid brake control by the Select Low Operation is performed and when one of the right and left wheels is in the pressure reducing mode and the other wheel is in the service braking sate. Thereby, the braking distance can be shortened.

What I claim is:

1. A method of controlling an anti-skid brake system of a vehicle equipped with one anti-skid brake control modulator common to both brakes of right and left wheels disposed on one axle and with two wheel speed sensors for the right and left wheels respectively, in which during braking, an anti-skid brake control is performed equally to the right and left wheels by detecting each wheel speed of said right and left wheels, judging each locking tendency of said right and left wheels based on said detected wheel speeds, and selecting judgement of the locking tendency based on a low wheel speed in the right and left wheel speeds, said method comprising:

setting the anti-skid brake control modulator for the right and left wheels to one of a retaining mode and a slow pressure intensifying mode when one of the right and left wheels is judged to require a pressure reducing mode and the other of the right and left wheels is judged to require a service braking mode.

2. A method of controlling an anti-skid brake system for a vehicle including right and left wheel brakes, one anti-skid brake control modulator common to the right and left wheel brakes, and two wheel speed sensors for detecting speeds of right and left wheels, said method comprising, detecting each wheel speed of said right and left wheels, judging locking tendencies for said right and left wheels based on said detected wheel speeds to pre-select control modes for the right and left wheels based on the locking tendencies, and setting the anti-skid brake control modulator for the right and left wheels to one of a retaining mode and a slow pressure intensifying mode when one of the right and left wheels was pre-selected as a pressure reducing mode and the other of the right and left wheels was preselected as a service braking mode.

3. A method of controlling an anti-skid brake system according to claim 2, wherein said locking tendencies for the right and left wheels are judged by comparing the detected wheel speeds with a vehicle speed, respectively.

4. A method of controlling an anti-skid brake system according to claim 3, wherein said anti-skid brake control modulator selects one of the preselected control modes in the right and left wheels by Select Low Operation except that said one of the right and left wheels is the pressure reducing mode and said other is the service braking mode.

* * * * *